US008493965B2

(12) United States Patent
Kumarasamy et al.

(10) Patent No.: US 8,493,965 B2
(45) Date of Patent: Jul. 23, 2013

(54) H.323 TO SIP INTERWORKING FOR CALL TRANSFERS

(75) Inventors: Parameswaran Kumarasamy, San Jose, CA (US); Jayesh Chokshi, Cupertino, CA (US); Anantha Seetharaman, Santa Clara, CA (US); Kavithadevi Parameswaran, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1893 days.

(21) Appl. No.: 11/497,769

(22) Filed: Aug. 2, 2006

(65) Prior Publication Data
US 2008/0043721 A1 Feb. 21, 2008

(51) Int. Cl.
*H04L 12/66* (2006.01)

(52) U.S. Cl.
USPC ........... 370/352; 370/356; 370/467; 370/522; 370/261; 370/466

(58) Field of Classification Search
USPC .................. 370/352–356, 395.2, 395.52, 261
See application file for complete search history.

(56) References Cited

U.S. PATENT DOCUMENTS

| | | | | |
|---|---|---|---|---|
| 6,470,020 B1 * | 10/2002 | Barker et al. | ................. | 370/401 |
| 7,002,989 B2 * | 2/2006 | Agrawal et al. | ............... | 370/467 |
| 7,616,749 B2 * | 11/2009 | Poustchi | ................... | 379/211.02 |
| 7,738,445 B2 * | 6/2010 | Ibezim et al. | ................... | 370/352 |
| 2001/0046234 A1 * | 11/2001 | Agrawal et al. | ............... | 370/402 |
| 2006/0007954 A1 * | 1/2006 | Agrawal et al. | ............... | 370/466 |
| 2006/0142010 A1 * | 6/2006 | Tom et al. | ...................... | 455/445 |
| 2006/0233176 A1 * | 10/2006 | Stumer | ....................... | 370/395.2 |
| 2006/0268754 A1 * | 11/2006 | Ibezim et al. | ................... | 370/261 |
| 2007/0058639 A1 * | 3/2007 | Khan | ........................ | 370/395.52 |
| 2007/0201512 A1 * | 8/2007 | Mills et al. | ...................... | 370/467 |
| 2007/0288562 A1 * | 12/2007 | Shaffer et al. | .................. | 709/204 |

OTHER PUBLICATIONS

H. Schulzrinne, "Session Initiation Protocol (SIP)-H.323 Interworking Requirements" Network Working Group, 16 pages, Jul. 2005.
Hemant Agrawal, "SIP-H.323 Interworking" Internet Engineering Task Force, 63 pages, Jul. 2001.

* cited by examiner

*Primary Examiner* — Asad Nawaz
*Assistant Examiner* — Khaled Kassim
(74) *Attorney, Agent, or Firm* — Fish & Richardson P.C.

(57) ABSTRACT

In one embodiment, a first end device associated with a first user and a second end device associated with a second user may be participating in a call. During the call, the second user may wish to transfer the call to a third user. The second user has the choice of using a blind transfer or a consult transfer. In one embodiment, a gateway determines interworking information that is needed to interwork an H.450.2 message for the H.323 protocol to a SIP REFER message, and vice versa, to allow the call transfer.

13 Claims, 10 Drawing Sheets

```
                                                             500
                                                            ↙

REFER sip:1001@1.2.177.60:5060 SIP/2.0
        Via: SIP/2.0/UDP 1.2.177.63:5060;branch=z9hG4bKE37DB
502 ⌒  From: <sip:3001@1.2.177.63>;tag=51F684C0-25C9
        To: <sip:1001@1.2.177.60>;tag=9A282F08-D3A
        Date: Wed, 06 Apr 2005 17:59:18 GMT
        Call-ID: 60E2C54E-A5FC11D9-8162C2EB-982C8879@1.2.177.60
504 ⌒  Refer-To: sip:2001@1.2.177.60
506 ⌒  Referred-By: sip:3001@1.2.177.63
        User-Agent: Cisco-SIPGateway/IOS-12.x
        Max-Forwards: 70
        Timestamp: 1112810358
        CSeq: 102 REFER
        Content-Length: 0
```

*Fig. 5A*

```
                                                          508
002473: *Mar 12 16:47:55.864: H450 OUTGOING PDU ::=      ↙
value CTInitiateArg ::=
  {
    callIdentity ""
    reroutingNumber
    {
      destinationAddress
      {
        dialedDigits : "2001"  ⌒ 510
      }
    }
  }
```

*Fig. 5B*

```
                                                             512
002476: *Mar 12 16:47:55.864: H450 OUTGOING PDU ::=        ↙
value H4501SupplementaryService ::=
  {
    networkFacilityExtension
    {
      sourceEntity endpoint : NULL
      destinationEntity endpoint : NULL
    }
    interpretationApdu discardAnyUnrecognizedInvokePdu : NULL
    serviceApdu rosApdus :
    {
      invoke :
      {
        invokeId 11
        opcode local : 9
        argument {"000101806334"} ⌒ 514
      }
    }
  }
```

*Fig. 5C*

H.323 TO SIP INTERWORKING FOR CALL TRANSFERS

TECHNICAL FIELD

Embodiments of the present invention generally relate to telecommunications and more specifically to providing an H.323 to SIP interworking, and vice versa, for a call transfer.

BACKGROUND OF THE INVENTION

Voice over internet protocol (VOIP) has become popular and prevalent for communications. VOIP systems may use different protocols, such as H.323 and session initiation protocol (SIP), to set up calls. Previously, end devices communicating using different protocols, such as one end device communicating an H.323 and another end point communicating using SIP, could not communicate. However, basic connections for interworking the H.323 and SIP protocols has been addressed where a call between two parties can be set up when the H.323 and SIP protocols are being used. However, the interworking defined includes only basic connections and does not provide interworking for supplementary features that are either provided by H.323 or SIP.

BRIEF DESCRIPTION OF THE DRAWINGS

FIG. 5A depicts an example of a SIP REFER message according to one embodiment of the present invention.

FIG. 5B shows an example of an H.450.2 message that is generated using the interworking information according to one embodiment of the present invention.

FIG. 5C shows another example of an H.450.2 message that is generated using the interworking information according to one embodiment of the present invention.

DESCRIPTION OF EXAMPLE EMBODIMENTS

Embodiments of the present invention provide interworking between an H.323 protocol and SIP protocol for a call transfer. In one embodiment, a first end device associated with a first user and a second end device associated with a second user may be participating in a call. During the call, the second user may wish to transfer the call to a third user. The second user has the choice of using a blind transfer or a consult transfer. In one embodiment, the first end device may communicate using the H.323 protocol and the second end device may communicate using SIP. The second end device can send a SIP REFER message to transfer the call to a third end device associated with a third user. The gateway receives the SIP REFER message and needs to facilitate the call transfer to the third device. However, because the first end device communicates using H.323, the SIP REFER message cannot be forwarded to it.

The gateway thus determines interworking information that is needed for the H.323 protocol. For example, the gateway may determine an identifier for the third user. The gateway then generates an H.450.2 message for the H.323 protocol using the interworking information. The H.450.2 message is sent and initiates the call transfer to the third user.

In another embodiment, the second end device uses the H.323 protocol and the first end device uses SIP. In this case, the gateway receives an H.450.2 message for the call transfer to the third user. The gateway determines interworking information needed for the SIP protocol. The gateway then generates a SIP REFER message using the interworking information. The SIP REFER message is then sent where the SIP REFER message initiates the call transfer to the third user. Accordingly, interworking between SIP and the H.323 protocol enable call transfers between end devices using SIP and the H.323 protocol.

Figure 1:
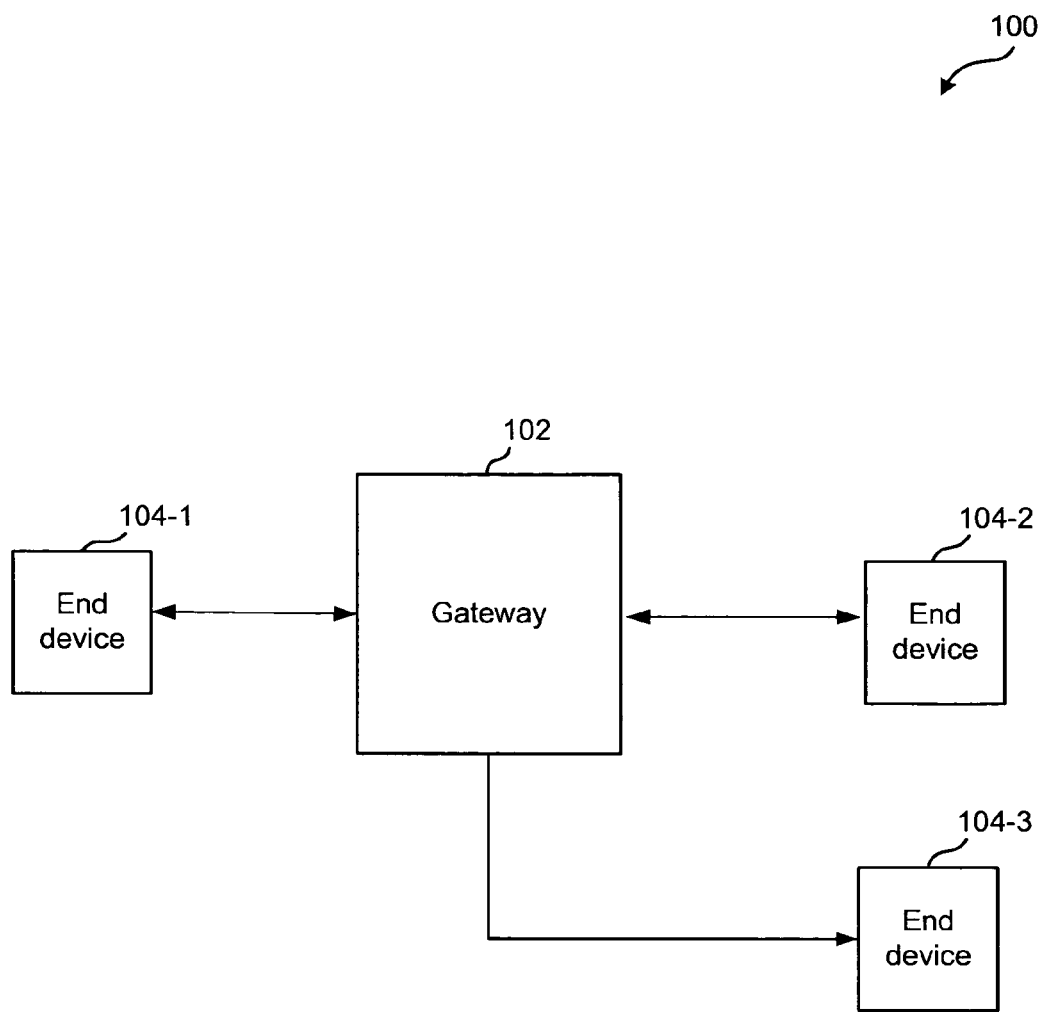
FIG. 1 depicts a simplified system for providing interworking between the H.323 protocol and SIP according to one embodiment of the present invention.

FIG. 1 depicts a simplified system 100 for providing interworking between the H.323 protocol and SIP according to one embodiment of the present invention. As shown, a gateway 102 and end devices 104 are provided.

End devices 104 may be any devices that can participate in a communication. For example, end devices 104 may be VOIP telephones, computers, instant messaging clients, cell phones, soft phones, or any other devices that can participate in a communication.

End devices 104 may communicate using either the H.323 protocol or SIP. Although H.323 and SIP are described, it will be recognized that other protocols may be appreciated. For example, successor protocols or enhancements to H.323 and/or SIP may be used by embodiments of the present invention.

In one embodiment, end device 104-1, end device 104-2, and/or end device 104-3 may be different networks. They may be interconnected via gateway 102.

Gateway 102 may be any network device configured to manage communications with end devices 104. In one embodiment, gateway 102 includes session border controllers, SIP proxies, IP-PBXs, media gateways, soft switches, back-to-back user agents (B2BUAs), IP-to-IP gateways, etc. Gateway 102 sits in-between end devices 104 and may interconnect various networks that use different protocols and services.

Gateway 102 is configured to provide interworking between different protocols. In one example, end device 104-1 may communicate using a first protocol and end device 104-2 and/or end device 104-3 may communicate using a second protocol. Gateway 102 provides interworking between different protocols such that end device 104-1 may communicate with end device 104-2 and/or end device 104-3.

In one embodiment, gateway 102 may interwork a SIP REFER message to an H.450.2 message in the H.323 protocol. Also, gateway 102 may interwork an H.450.2 message to a SIP REFER message. This may cause a call transfer from, for example, end device 104-2 to end device 104-3.

In one embodiment, a blind transfer and consult transfer can be performed using gateway 102. Signaling for providing the two transfers will be described in more detail below.

Figure 2:
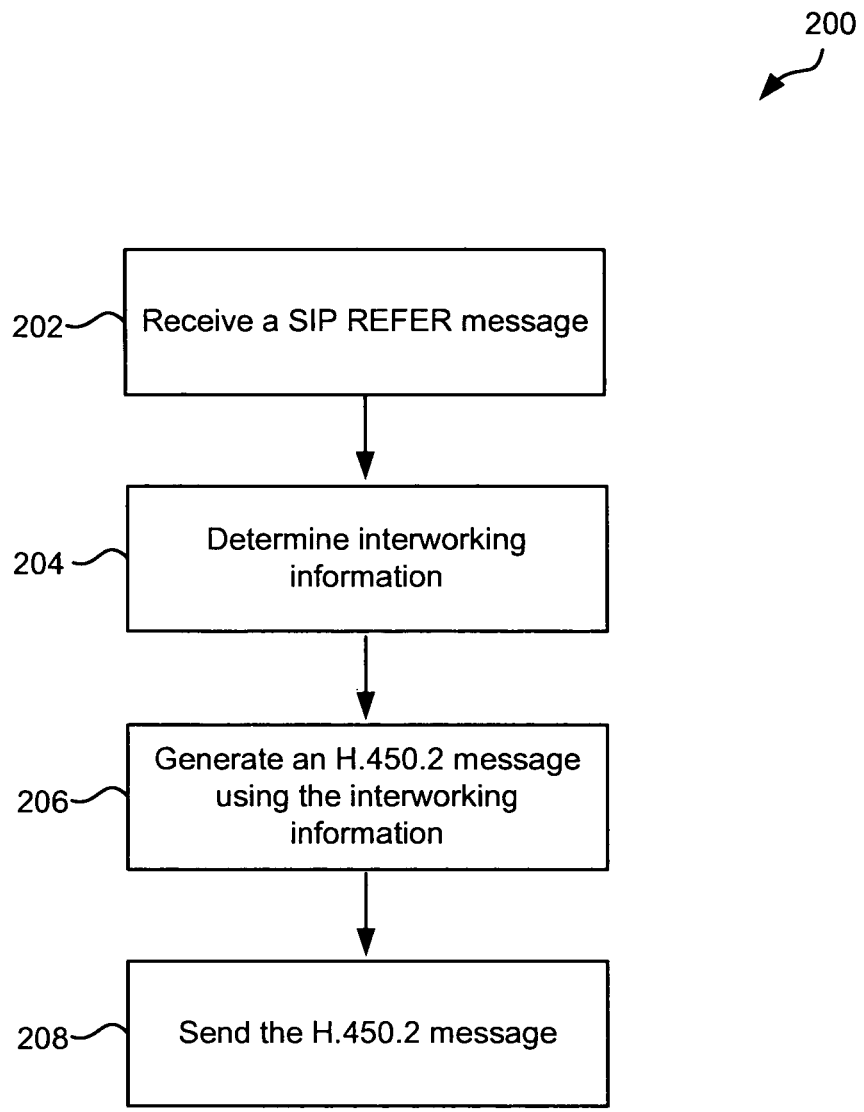
FIG. 2 depicts a simplified flowchart of a method for interworking between an H.323 protocol and a SIP protocol for a call transfer according to one embodiment of the present invention.

FIG. 2 depicts a simplified flowchart 200 of a method for interworking between an H.323 protocol and a SIP protocol for a call transfer according to one embodiment of the present invention. This figure discusses a method of interworking from a SIP REFER message to an H.450.2 message.

In step 202, gateway 102 receives a SIP REFER message from end device 104-2. The SIP REFER message indicates that a transfer to a device 104-3 is desired.

In step 204, gateway 102 determines interworking information for the call transfer. Because end device 104-1 and end device 104-2 communicate using different protocols, the SIP REFER message cannot be forwarded to end device 104-1 to initiate the transfer. Accordingly, interworking information is determined. In one embodiment, gateway 102 parses the REFER message to determine fields that include information that should be included in (or may be used to determine information to include in) an H.450.2 message.

In step 206, gateway 102 generates an H.450.2 message using the interworking information. The H.450.2 message is a message that can initiate a transfer to end device 104-3 in the H.323 protocol.

In step 208, gateway 102 sends the H.450.2 message to end device 104-1. This initiates a transfer of the call to end device 104-3. As is known in the art, the transfer may then be completed using additional H.323 messages and SIP messages.

Figure 3:
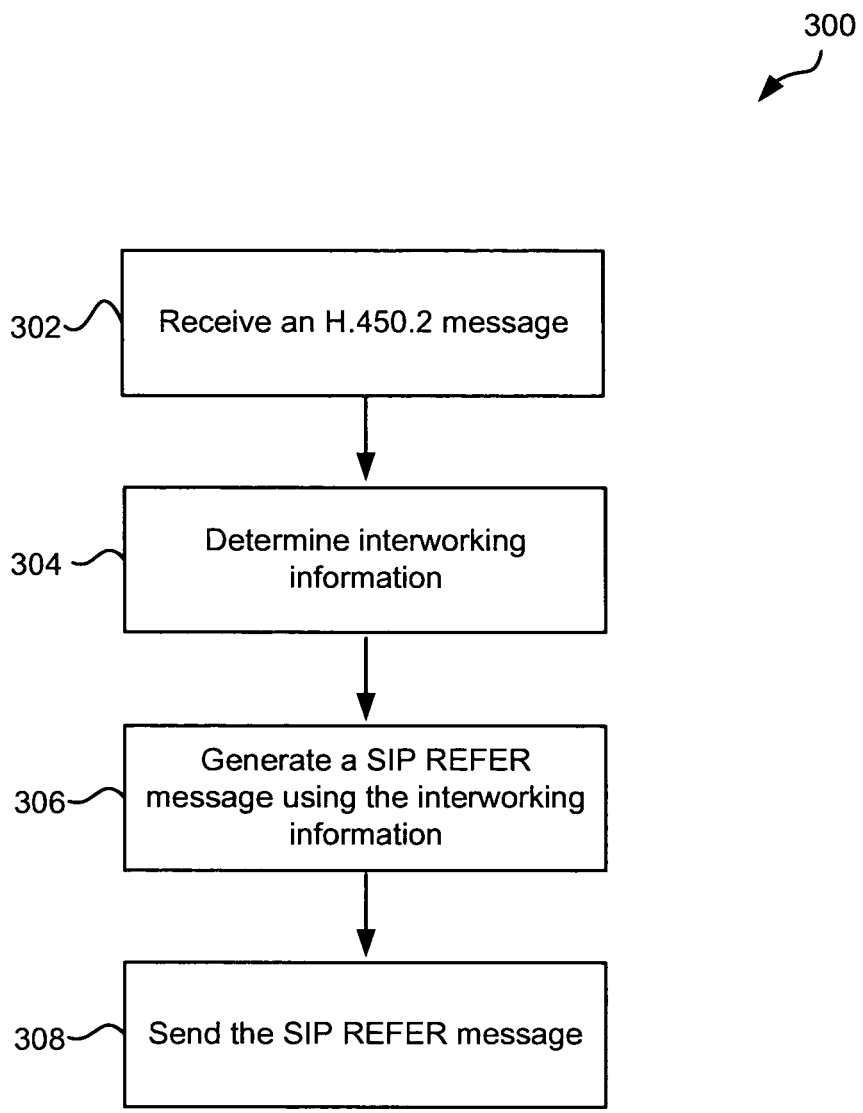
FIG. 3 depicts a simplified flowchart of a method for interworking the H.450.2 message to a SIP REFER message according to one embodiment of the present invention.

FIG. 3 depicts a simplified flowchart 300 of a method for interworking the H.450.2 message to a SIP REFER message according to one embodiment of the present invention. In step 302, gateway 102 receives an H.450.2 message from end device 104-2 for the transfer of the call to end device 104-3.

In step 304, gateway 102 determines interworking information for a call transfer. In one embodiment, gateway 102 determines identification information for end device 104-3.

In step 306, gateway 102 generates a SIP REFER message using the interworking information. The SIP REFER message initiates a call transfer to end device 104-3.

In step 308, gateway 102 sends the SIP REFER message to end device 104-1. This initiates a transfer of the call to end device 104-3. As is known in the art, the transfer may then be completed using additional H.323 messages and SIP messages.

The above interworking described in FIGS. 2 and 3 may be used in a blind transfer or consult transfer. It will be recognized that other steps may be provided for a blind transfer and/or consult transfer, which will be described in more detail below.

Figure 4:
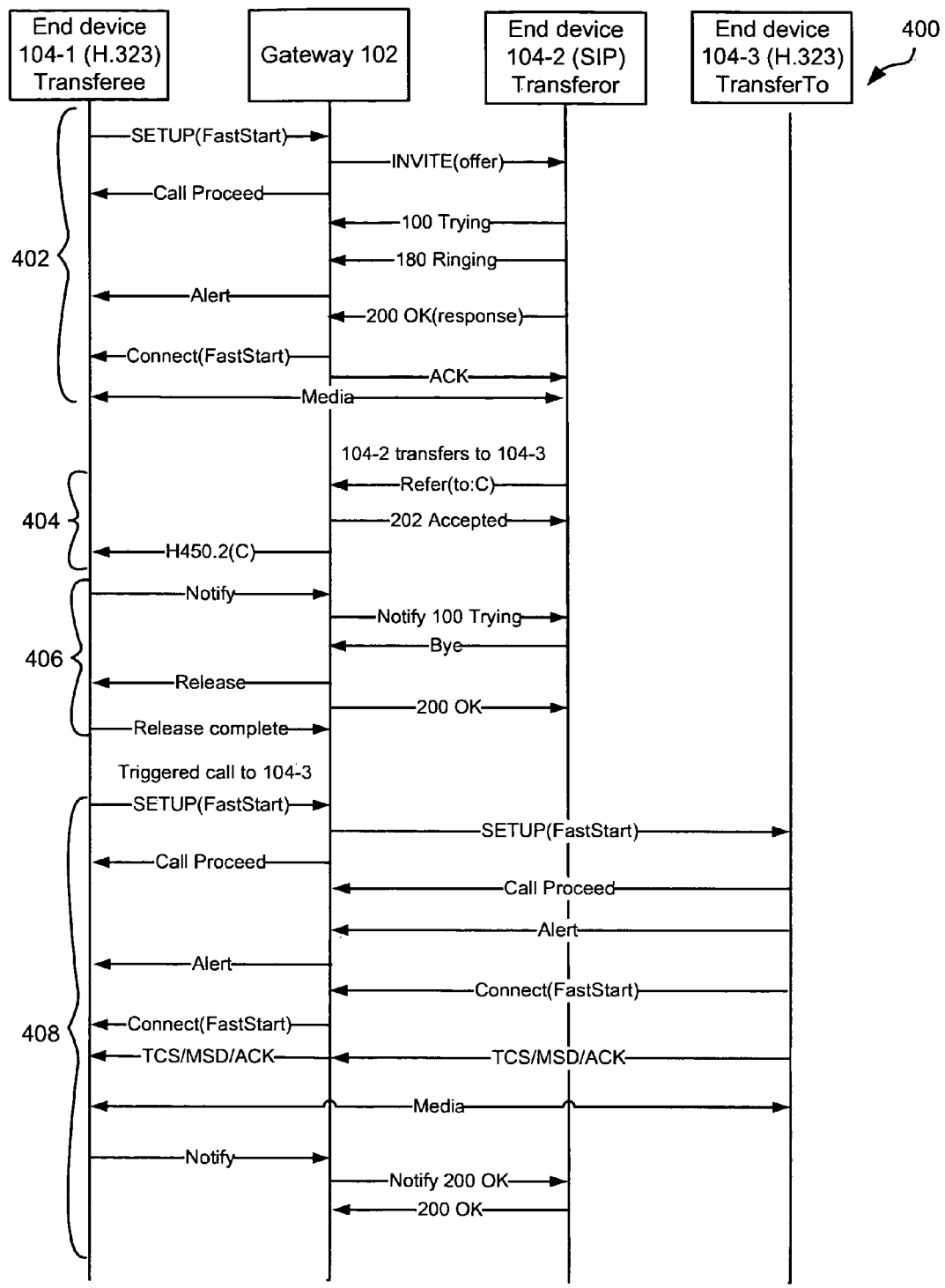
FIG. 4 depicts a call flow showing a SIP REFER to an H.450.2 blind transfer according to one embodiment of the present invention.

Examples of call flows will now be described. The call flows are for blind and consult transfers. Although these call flows are described, it will be recognized that other call flows will be appreciated. FIG. 4 depicts a call flow 400 showing a SIP REFER to an H.450.2 blind transfer according to one embodiment of the present invention. End device 104-1, end device 104-2, and end device 104-3 are in different networks. End device 104-1 and end device 104-3 can communicate using the H.323 protocol and end device 104-2 can communicate using SIP.

Also, end device 104-2 is the transferor, end device 104-1 is the transferee, and end device 104-3 is the transferTo. The transferor initiates the transfer, the transferee receives the transfer request and processes it to cause the transfer, and the transferTo is the party to which the call is transferred.

In call flow 402, end device 104-1 sets up a call with end device 104-2. As shown, H.323 signaling messages are interworked into SIP messages to set up the call. Media then flows around gateway 102 between end device 104-1 and end device 104-2.

At call flow 404, end device 104-2 transfers the call to end device 104-3. As shown, a SIP REFER message is sent from end device 104-2 to gateway 102. The REFER message is for a blind transfer and includes an identifier for end device 104-3 (e.g., C). The identifier may be a telephone number, email address, username, etc. The blind transfer uses the feature of"REFER(Refer-to:)". When an identifier is included in the Refer-to: field, such as "Refer-to:C", this requests a blind transfer to C.

Gateway 102 then needs to send a call transfer message to end device 104-1. However, end device 104-1 communicates using the H.323 protocol. Thus, the SIP REFER message cannot be directly transferred to end device 104-1. Accordingly, gateway 102 determines interworking information that needs to be included for an H.450.2 message to end device 104-1.

FIG. 5A depicts an example of a SIP REFER message 500 according to one embodiment of the present invention. Gateway 102 may parse message 500 to determine information needed for the H.450.2 message.

In one embodiment, gateway 102 determines that end device 104-2, which is identified by Referred-by field 506, wants to transfer the call to the identifier included in a Refer-to field 504 (e.g., <SIP:2001@1.2.177.3.60). Gateway 102 notes the identifier as interworking information.

FIG. 5B shows an example of an H.450.2 message 508 that is generated using the interworking information according to one embodiment of the present invention. In a rerouting Number dialedDigits field 510, an identifier for end device 104-3 is included in the H.450.2 message. As shown, "2001" is taken from information in Refer-to field 504 and included in dialedDigits field 510. This provides a transfer to end device 104-3 at a destination identifier of "2001".

FIG. 5C shows another example of an H.450.2 message 512 that is generated using the interworking information according to one embodiment of the present invention. In an argument field 514, encoded data that is displayed in message 508 is included.

Referring back to FIG. 4, a SIP REFER message is parsed and interworking information needed to generate H.450.2 message is determined. The interworking information is used to generate the H.450.2 message, which is sent from gateway 102 to end device 104-1 as shown in call flow 404.

Call flow 406 is used to notify end device 104-2 that end device 104-1 is attempting to transfer a call to end device 104-3. End device 104-2 may drop out of the call once it is confirmed that the transfer is proceeding. This is shown by the SIP BYE message and the H.323 Release message.

The call transfer to end device 104-3 is triggered in a call flow 408. In this case, end device 104-1 initiates a call to end device 104-3. A call is connected and media may flow between end device 104-1 and end device 104-3. Accordingly, the call between end device 104-1 and end device 104-2 has been transferred from end device 104-2 to end device 104-3. This is a blind transfer and is performed by interworking a SIP REFER message for a blind transfer to an H.450.2 message. The H.450.2 message causes end device 104-1 to establish a call with end device 104-3 while the call with end device 104-2 is ended.

Figure 6A:
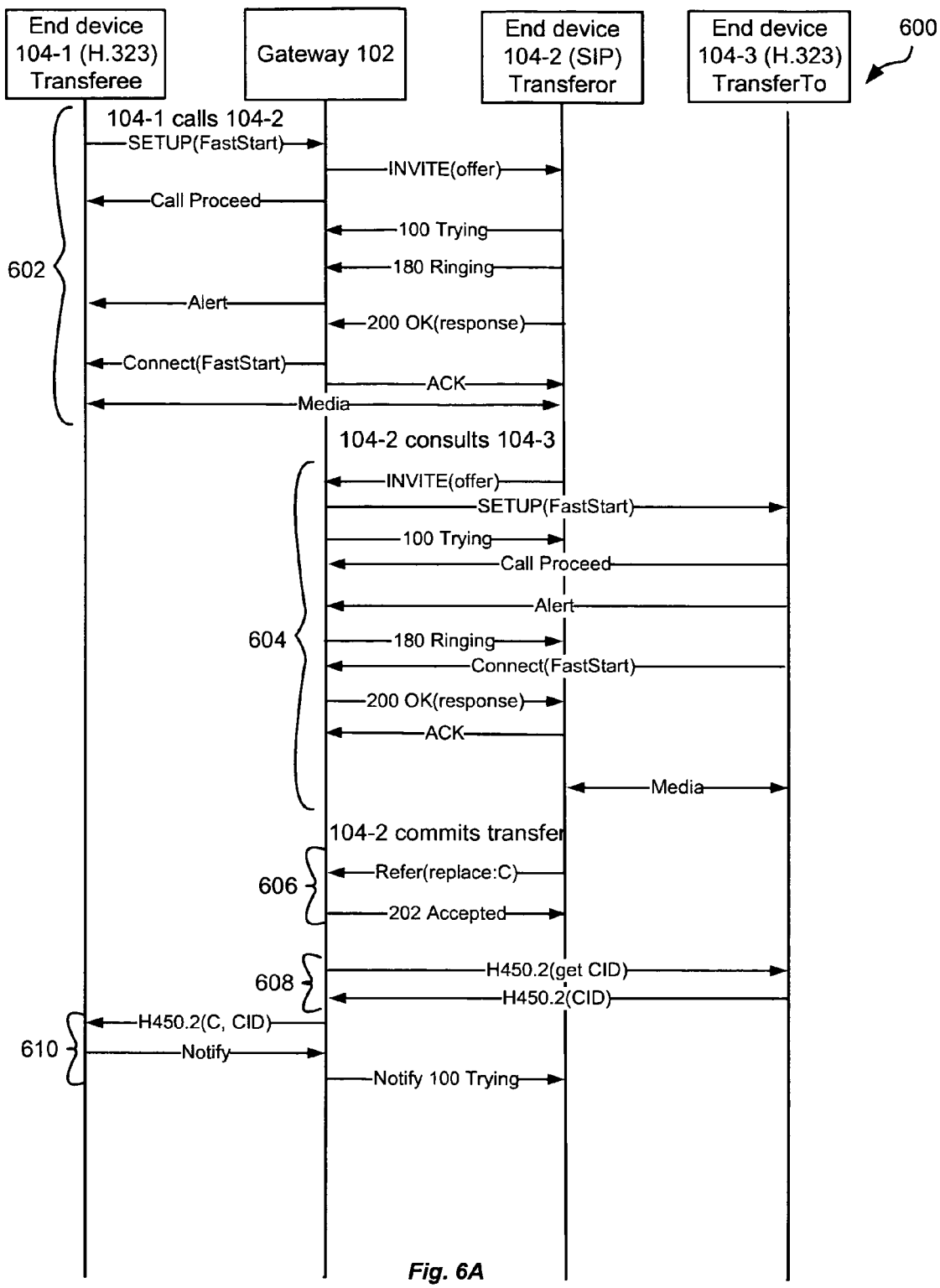
FIGS. 6A and 6B depicts a call flow for a consult transfer with an interworking of a SIP REFER message to an H.450.2 message according to one embodiment of the present invention.
Figure 6B:
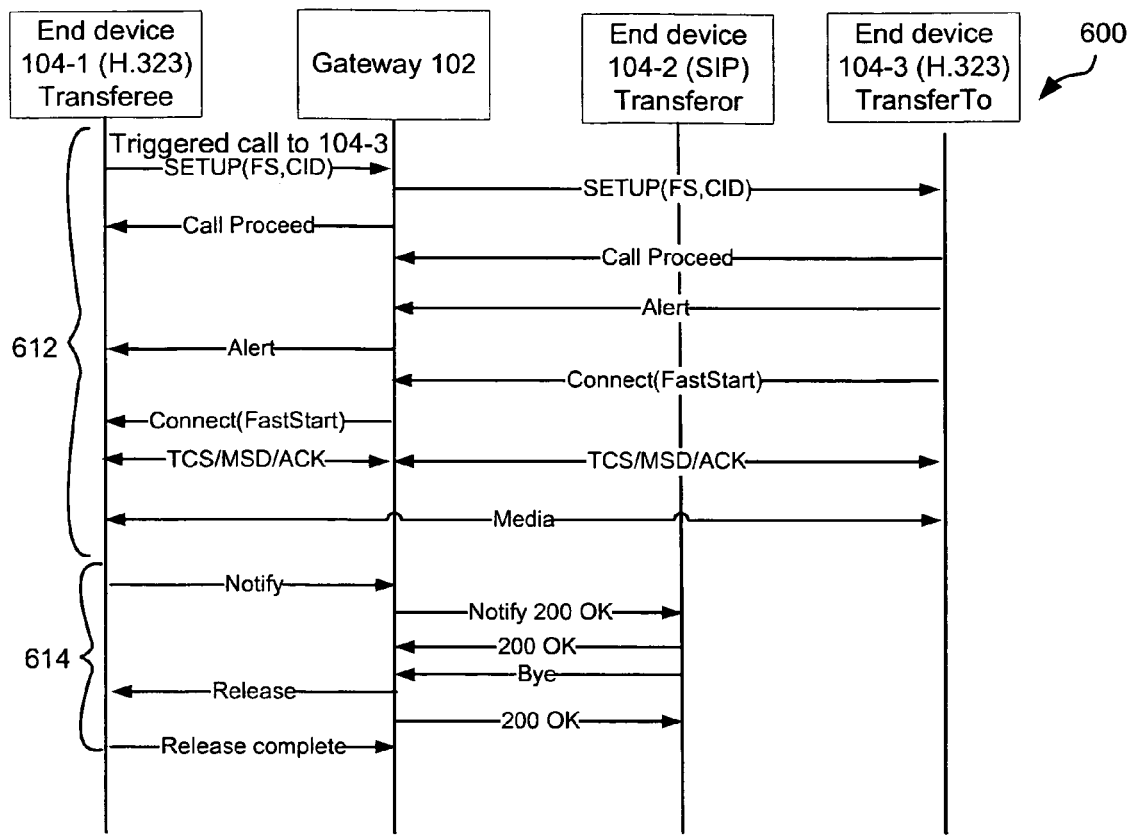

FIGS. 6A and 6B depicts a call flow 600 for a consult transfer with an interworking of a SIP REFER message to an H.450.2 message according to one embodiment of the present invention. In this embodiment, end device 104-1 and end device 104-3 communicate using the H.323 protocol and end device 104-2 communicates using SIP. End device 104-1 and end device 104-2 may be participating in a call and then end device 104-2 performs a consult transfer to end device 104-3.

Also, end device 104-2 is the transferor, end device 104-1 is the transferee, and end device 104-3 is the transferTo.

Referring FIG. 6A, in a call flow 602 shows signaling messages for setting up a call between end device 104-1 and end device 104-2. As shown, end device 104-1 sends H.323 messages, which are interworked to SIP messages. Media can then flow between end device 104-1 and end device 104-2 after the call is set up.

In a call flow 604, a user B (end device 104-2) consults a user C (end device 104-3) for the consult transfer. At this point, the call with end device 104-1 may be put on hold, with music or no music. In this case, end device 104-2 communicates using SIP and end device 104-3 communicates using H.323. End device 104-2 sends signaling messages to gateway 102 in SIP. Gateway 102 may then interwork the SIP messages into H.323 messages to set up the call. Media can then flow between end device 104-2 and end device 104-3 after the call is set up (i.e., user B can ask user C if he/she accepts the transfer).

After talking with a user C, a user B may initiate the transfer to the user C's end device 104-3 in a call flow 606. In this case, end device 104-2 sends a SIP REFER message for a consult transfer to gateway 102. The SIP REFER message for the consult transfer is different from the SIP REFER for the blind transfer. In one example, the REFER message may be "REFER (replace:C)", where C is an identifier for end device 104-3 and the REPLACE header identifies the call is between end device 104-2 and end device 104-3.

In a call flow 608, gateway 102 determines a consult ID for the consult transfer. A consult ID is needed because a call with user C has already been established using an identifier for user C. Thus, user C cannot take another call using user C's identifier. Accordingly, a consult ID needs to be determined from end device 104-3. As shown, an H.450.2 (GETCID) message is sent to determine the consult ID. End device 104-3 sends an H.450.2 (CID) message that includes a consult ID for end device 104-3.

Gateway 104 then sends an H.450.2 message for a consult transfer in call flow 610. This H.450.2 message includes the consult ID (CID) determined.

Referring to FIG. 6B, when end device 104-1 receives H.450.2 consult transfer message, end device 104-1 sets up a call between end device 104-1 and end device 104-3 in a call flow 612. As shown, a media stream flows between end device 104-1 and end device 104-3 when the consult transfer is complete.

In a call flow 614, end device 104-1 may end the call with end device 104-2. The call is ended by sending H.323 messages to gateway 102, which can then interwork the messages to SIP messages sent to end device 104-2. Accordingly, the call with end device 104-2 is ended and a transfer is provided to end device 104-3.

Figure 7A:
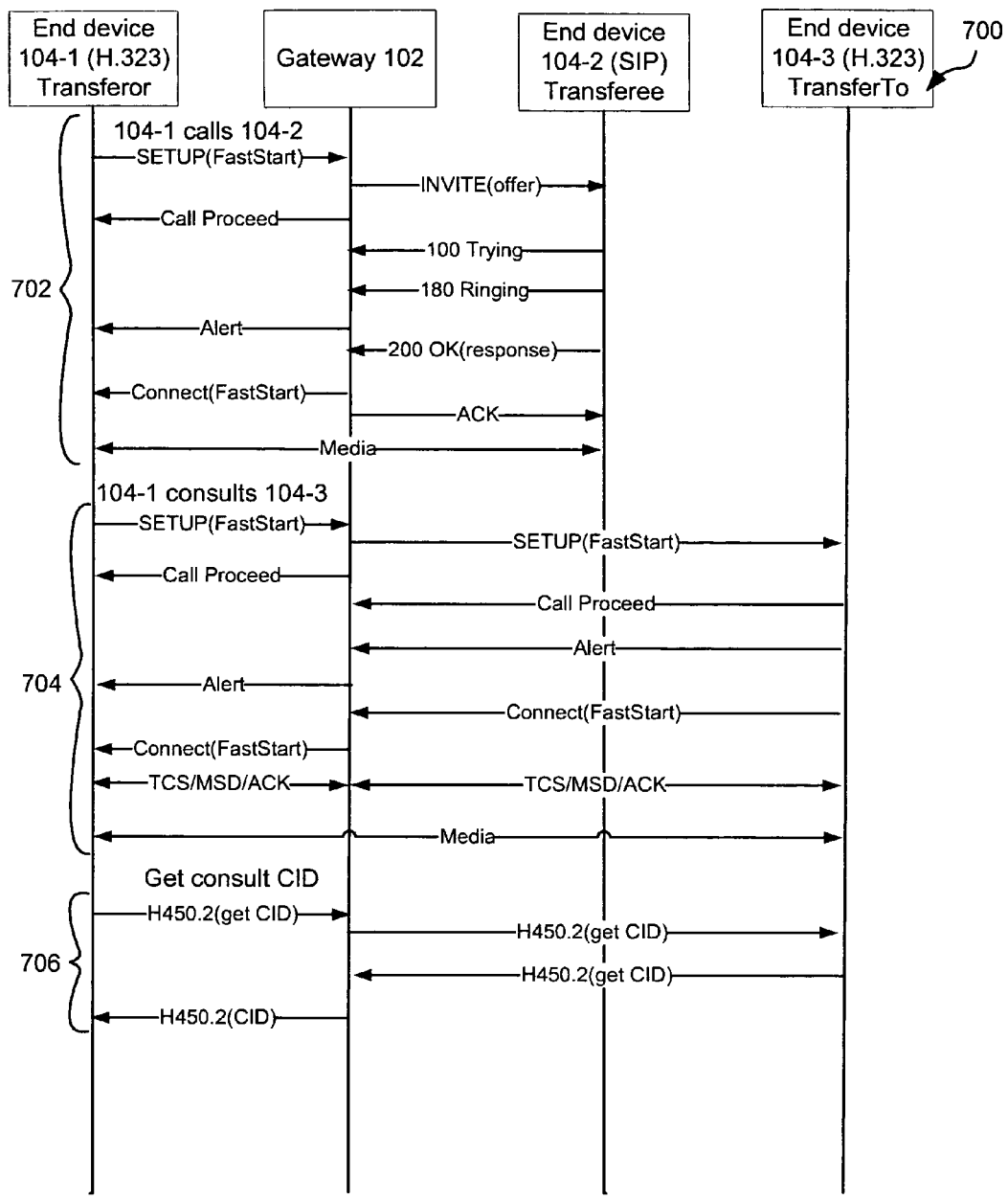
FIGS. 7A and 7B depicts a call flow for a consult transfer from the H.323 protocol to SIP protocol according to one embodiment of the present invention.
Figure 7B:
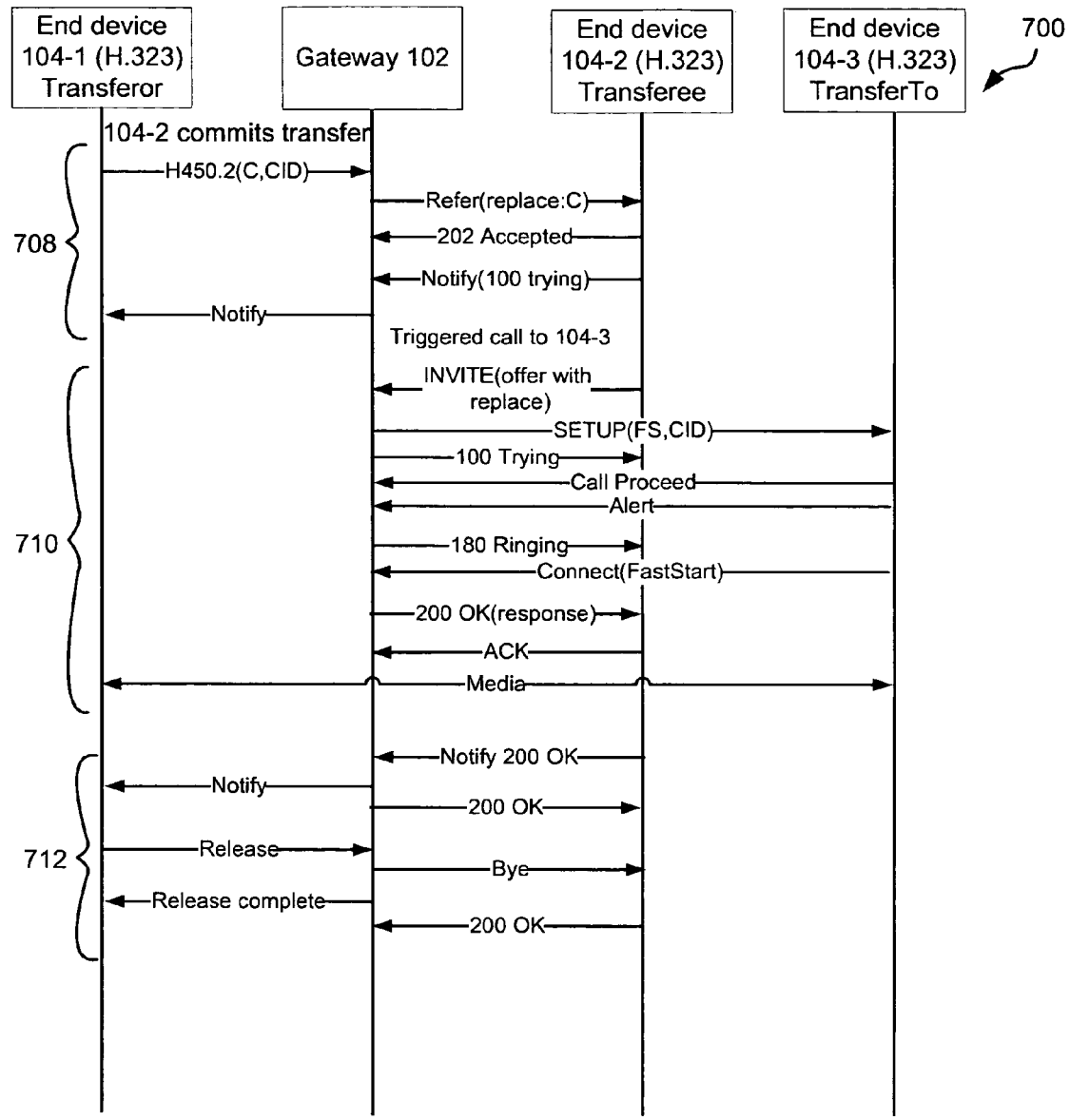

FIGS. 7A and 7B depicts a call flow 700 for a consult transfer from the H.323 protocol to SIP according to one embodiment of the present invention. In this embodiment, end device 104-1 and end device 104-3 communicate using H.323, and end device 104-2 communicates using SIP. End device 104-1 is the transferor, end device 104-2 is the transferee, and end device 104-3 is the transferTo. For example, end device 104-1 may call end device 104-2. End device 104-1 then does a consult transfer to end device 104-3.

Referring to FIG. 7A, in a call flow 702, end device 104-1 sets up a call with end device 104-2. End device 104-1 sends H.323 messages to gateway 102, which may interwork the H.323 messages to SIP messages, and send them to end device 104-2. After the call is set up, media may flow between end device 104-1 and end device 104-2.

In a call flow 704, end device 104-1 places a call to end device 104-3 for a consult transfer. As shown, end device 104-1 may send H.323 messages to gateway 102. Gateway 102 may then send them to end device 104-3. Media then flows between end device 104-1 and end device 104-3 after the call is set up. In this case, user A may ask user C if he/she would like the call to be transferred to him/her.

In a call flow 706, end device 104-1 initiates the consult transfer. As discussed above, a consult ID is needed for the consult transfer because end device 104-1 is already on a call with end device 104-3. As shown, an H.450.2 (GET CID) message is sent that requests the consult ID for end device 104-3. Because end device 104-3 communicates using H.323, the H.450.2 (GET CID) message is forwarded to end device 104-3.

End device 104-3 then sends an H.450.2 (CID) message with a consult ID to gateway 102. Gateway 102 then forwards the H.450.2 (CID) message to end device 104-1.

Referring to FIG. 7B, a call flow 708 then commits the consult transfer from end device 104-2 to end device 104-3. End device 104-1 sends an H.450.2 (CID) message to commit a consult transfer to end device 1040-3.

Gateway 102 interworks the H.450.2 (CID) message to a SIP REFER message. In one embodiment, gateway 102 parses the H.450.2 message to determine interworking information that is needed for the SIP REFER message. In one example, the consult ID is used to determine an identifier for end device 104-3 that is needed for the call transfer. Based on the H.323 consult id, the corresponding SIP REPLACE header is obtained by gateway 102. This is included in the REFER message.

Gateway 102 then sends a SIP REFER message (e.g., REFER(Replace:C)) to end device 104-2. The SIP REFER message initiates a consult transfer from end device 104-2 to end device 104-3.

A call flow 710 is then performed to commit the call transfer. As shown, end device 104-2 sends an invite message with an offer to place the call with C. Gateway 102 initiates a call to end device 104-3. The offer has a REPLACE header that identifies the initial call with end device 104-3. The corresponding consult id CID is included in the SETUP to 104-3. Using this CID, end device 104-3 replaces the consult call it has with end device 104-1 with this new triggered call from end device 104-2.

When the call is set up with end device 104-3, a call flow 712 is performed in which the call between end device 104-1 and end device 104-2 is ended. In this case, end device 104-2 may send SIP messages that gateway 102 may interwork to H.323 messages for end device 104-1. Accordingly, a consult transfer is performed using the above call flow from end device 104-2 to end device 104-3.

Although a full consult transfer is described above, it will be recognized that a semi-consult transfer also known as consult at alert may be provided. In the semi-consult case, the transfer may be committed when a transferTo is alerted instead of waiting for the transferTo to answer the consult call. In this case, the call is ended with the transferor when the call is committed.

It should be noted that the above call flows are for a media flow-around where media flows directly between end devices 104 and not via gateway 102. A similar call flow may be provided in which media flows through gateway 102. In both media flow around and media flow through calls, signaling always flows via gateway 104. A person skilled in the art will appreciate calls flows where media flows through gateway 102. In this case, identification information for gateway 102 may be included in the media being sent, such as a gateway's address and RTP ports, which are then used to terminate and re-originate media with end devices 104.

Accordingly, interworking is provided between H.323 and SIP networks for a call transfer. Mapping between an H.450.2 and SIP REFER messages is provided. An H.450.2 or SIP message is parsed to create a new message in the other protocol. Gateway 102 can intelligently determine which information is needed to interwork a SIP REFER message to an H.323 message, and vice versa. This allows a call transfer to be formed by end devices 104 that are in different networks and use different protocols.

Figure 8:
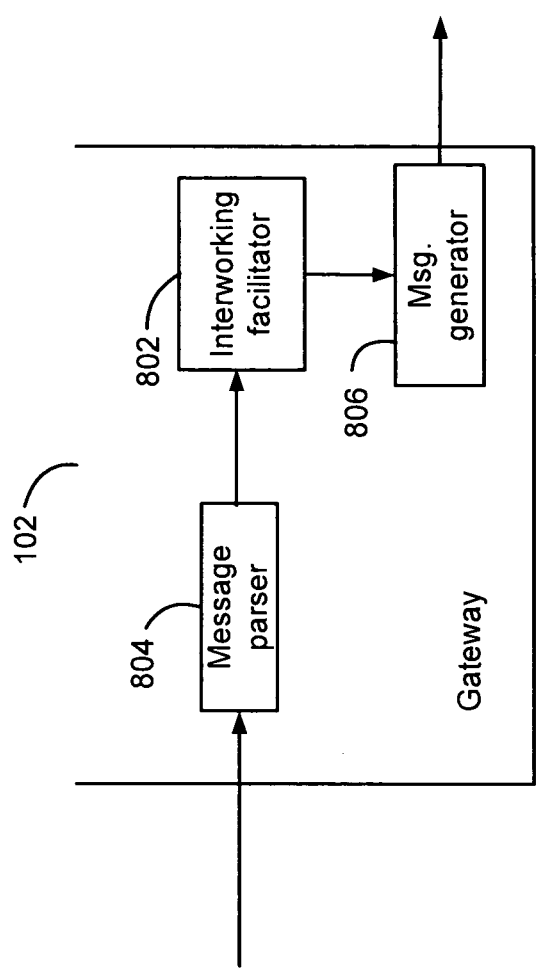
FIG. 8 depicts an embodiment of a gateway according to embodiments of the present invention.

FIG. 8 depicts a more detailed embodiment of gateway 102 according to embodiments of the present invention. As shown, an interworking facilitator 802, a message parser 804, and a message generator 806 are provided.

Message parser 804 then determines interworking information from the message received. Message parser 804 includes logic that intelligently parses fields of a message and determines interworking information. For example, message parser 804 can parse an H.450.2 message and determine which information is needed for a SIP REFER message. Further, message parser 804 can parse a SIP REFER message and determine which information is needed for an H.450.2 message. For example, an identifier for the user in which the call will be transferred may be determined. Also, any other information that is needed to generate a message in the other protocol is determined.

Interworking facilitator 802 is configured to determine when a call transfer is requested. In this case, a SIP REFER message or H.450.2 message for a call transfer may be received.

Message generator 806 then generates a message. For example, if the call transfer message is an H.450.2 message, message generator 806 generates a SIP REFER message using the interworking information. Message generator 806 then sends the generated SIP REFER message.

Although the invention has been described with respect to specific embodiments thereof, these embodiments are merely illustrative, and not restrictive of the invention. For example, protocols other than SIP and H.323 may be appreciated.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A method comprising:
    establishing a first call between a first end device and a second end device, where the first end device communicates using an H.323 protocol and the second end device communicates using a SIP protocol;
    receiving, from the second end device and during the first call, a SIP REFER message for a call transfer of the first call to a third end device;
    determining, based on the received SIP REFER message, that a call transfer of the first call from the second device to the third device is requested, wherein the SIP REFER message includes information indicating that a new call is to be established between the first end device and the third end device for the call transfer;
    determining interworking information between the SIP protocol and the H.323 protocol for sending call transfer instructions to the first end device, by identifying fields in the SIP REFER message that are used to provide contextual information to the first end device regarding the call transfer, the identified fields including a first identifier associated with the third end device;
    generating an H.450.2 message for the H.323 protocol using the interworking information, the H.450.2 message instructing a call transfer from the second end device to the third end device, the H.450.2 message including the first identifier;
    sending the H.450.2 message to the first end device;
    terminating the first call between the first end device and the second end device;
    receiving, from the first end device and in response to sending the H.450.2 message, a signaling message to initiate a second call to the third end device, where the first end device and the third end device communicate using the H.323 protocol, the third end device being identified using the first identifier that is included in the signaling message; and
    transferring signaling messages between the third end device and the first end device using the H.323 protocol to set up the second call.

2. The method of claim 1, wherein the call transfer comprises a blind transfer, wherein the H.450.2 message is sent to the first end device without establishing a connection from the second end device to the third end device, such that a call setup from the first end device to the third end device uses a new call identifier.

3. An apparatus comprising:
    one or more processors; and
    logic encoded in one or more non-transitory machine-readable media for execution by the one or more processors and when executed cause the one or more processors to perform operations including:
        establishing a first call between a first end device and a second end device, where the first end device communicates using an H.323 protocol and the second end device communicates using a SIP protocol;
        receiving, from the second end device and during the first call, a SIP REFER message for a call transfer of the first call to a third end device;
        determining, based on the received SIP REFER message, that a call transfer of the first call from the second device to the third device is requested, wherein the SIP REFER message includes information indicating that a new call is to be established between the first end device and the third end device for the call transfer;
        determining interworking information between the SIP protocol and the H.323 protocol for sending call transfer instructions to the first end device, by identifying fields in the SIP REFER message that are used to provide contextual information to the first end device regarding the call transfer, the identified fields including a first identifier associated with the third end device;
        generating an H.450.2 message for the H.323 protocol using the interworking information, the H.450.2 message instructing a call transfer from the second end device to the third end device, the H.450.2 message including the first identifier;
        sending the H.450.2 message to the first end device;
        terminating the first call between the first end device and the second end device;
        receiving, from the first end device and in response to sending the H.450.2 message, a signaling message to initiate a second call to the third end device, where the first end device and the third end device communicate using the H.323 protocol, the third end device being identified using the first identifier that is included in the signaling message; and transferring signaling messages between the third end device and the first end device using the H.323 protocol to set up the second call.

4. The apparatus of claim 3, wherein the call transfer comprises a blind transfer, wherein the logic when executed by the one or more processors is operable to send the H.450.2 message to the first end device without establishing a connection from the second end device to the third end device, such that a call setup from the first end device to the third end device uses a new call identifier.

5. An apparatus comprising:

means for establishing a first call between a first end device and a second end device, where the first end device communicates using an H.323 protocol and the second end device communicates using a SIP protocol;

a processor;

one or more instructions encoded in non-transitory machine-readable media for execution by the processor and when executed cause the process to perform operations including:

receiving, from the second end device and during the first call, a SIP REFER message for a call transfer of the first call to a third end device;

determining, based on the received SIP REFER message, that a call transfer of the first call from the second device to the third device is requested, wherein the SIP REFER message includes information indicating that a new call is to be established between the first end device and the third end device for the call transfer;

determining interworking information between the SIP protocol and the H.323 protocol for sending call transfer instructions to the first end device, by identifying fields in the SIP REFER message that are used to provide contextual information to the first end device regarding the call transfer, the identified fields including a first identifier associated with the third end device;

generating an H.450.2 message for the H.323 protocol using the interworking information, the H.450.2 message instructing a call transfer from the second end device to the third end device, the H.450.2 message including the first identifier;

sending the H.450.2 message to the first end device;

terminating the first call between the first end device and the second end device;

receiving, from the first end device and in response to sending the H.450.2 message, a signaling message to initiate a second call to the third end device, where the first end device and the third end device communicate using the H.323 protocol, the third end device being identified using the first identifier that is included in the signaling message; and transferring signaling messages between the third end device and the first end device using the H.323 protocol to set up the second call.

6. A method comprising:

establishing a first call between a first end device and a second end device, where the first end device communicates using an H.323 protocol and the second end device communicates using a SIP protocol;

establishing a second call between the second end device and a third end device while the first call from the first end device to the second end device is existing;

receiving, from the second end device and during the first call, a SIP REFER message for a call transfer of the first call to the third end device;

determining, based on the SIP REFER message, that a call transfer of the first call is requested;

determining interworking information between the SIP protocol and the H.323 protocol for sending call transfer instructions to the first end device, by identifying fields in the SIP REFER message that are used to facilitate the call transfer, the identified fields including a first identifier associated with the third end device;

establishing a connection with the third end device using the first identifier to obtain a second identifier that is associated with the third end device and the second call;

generating an H.450.2 message for the H.323 protocol using the interworking information, the H.450.2 message instructing a call transfer from the second end device to the third end device, the H.450.2 message including the second identifier;

sending the H.450.2 message to the first end device;

receiving, from the first end device and in response to sending the H.450.2 message, a signaling message to join the second call, where the first end device and the third end device communicate using the H.323 protocol, the second call being identified using the second identifier that is included in the signaling message;

transferring signaling messages between the third end device and the first end device using the H.323 protocol to connect the first end device to the second call with the third end device; and terminating the first call between the first end device and the second end device.

7. An apparatus comprising:

one or more processors; and logic encoded in one or more non-transitory machine-readable media for execution by the one or more processors and when executed cause the one or more processors to perform operations including:

establishing a first call between a first end device and a second end device, where the first end device communicates using an H.323 protocol and the second end device communicates using a SIP protocol;

establishing a second call between the second end device and a third end device while the first call from the first end device to the second end device is existing;

receiving, from the second end device and during the first call, a SIP REFER message for a call transfer of the first call to the third end device;

determining, based on the SIP REFER message, that a call transfer of the first call is requested;

determining interworking information between the SIP protocol and the H.323 protocol for sending call transfer instructions to the first end device, by identifying fields in the SIP REFER message that are used to facilitate the call transfer, the identified fields including a first identifier associated with the third end device;

establishing a connection with the third end device using the first identifier to obtain a second identifier that is associated with the third end device and the second call;

generating an H.450.2 message for the H.323 protocol using the interworking information, the H.450.2 message instructing a call transfer from the second end device to the third end device, the H.450.2 message including the second identifier;

sending the H.450.2 message to the first end device;

receiving, from the first end device and in response to sending the H.450.2 message, a signaling message to join the second call, where the first end device and the third end device communicate using the H.323 protocol, the second call being identified using the second identifier that is included in the signaling message;

transferring signaling messages between the third end device and the first end device using the H.323 protocol to connect the first end device to the second call with the third end device; and based on connecting the first end device to the third end device via the second call, terminating the first call between the first end device and the second end device.

8. A method comprising:

establishing a first call between a first end device and a second end device, where the first end device communicates using a first protocol and the second end device communicates using a second protocol;

receiving, from the second end device and during the first call, a first message for a call transfer of the first call to a third end device;

determining, based on the first message, that a call transfer of the first call from the second device to the third device is requested, wherein the first message includes information indicating that a new call is to be established between the first end device and the third end device for the call transfer;

determining interworking information between the second protocol and the first protocol for sending call transfer instructions to the first end device, by identifying fields in the first message that are used to provide contextual information to the first end device regarding the call transfer, the identified fields including an identifier associated with the third end device;

generating an second message in the first protocol using the interworking information, the second message instructing a call transfer from the second end device to the third end device, the second message including the identifier;

sending the second message to the first end device;

terminating the first call between the first end device and the second end device;

receiving, from the first end device and in response to sending the second message, a signaling message to initiate a second call to the third end device, where the first end device and the third end device communicate using the first protocol, the third end device being identified using the identifier that is included in the signaling message; and transferring signaling messages between the third end device and the first end device using the first protocol to set up the second call.

9. The method of claim 8, wherein the first protocol is H.323 and the second protocol is SIP, wherein the first message is a SIP REFER message and the second message is a H.450.2 message.

10. The method of claim 8, wherein the first protocol is SIP and the second protocol is H.323, wherein the first message is a H.450.2 message and the second message is a SIP REFER message.

11. A method comprising:

establishing a first call between a first end device and a second end device, where the first end device communicates using a first protocol and the second end device communicates using a second protocol;

establishing a second call between the second end device and a third end device while the first call from the first end device to the second end device is existing;

receiving, from the second end device and during the first call, a first message for a call transfer of the first call to the third end device;

determining, based on the first message, that a call transfer of the first call is requested;

determining interworking information between the second protocol and the first protocol for sending call transfer instructions to the first end device, by identifying fields in the first message that are used to facilitate the call transfer, the identified fields including a first identifier associated with the third end device;

establishing a connection with the third end device using the first identifier to obtain a second identifier that is associated with the third end device and the second call;

generating an second message in the first protocol using the interworking information, the second message instructing a call transfer from the second end device to the third end device, the second message including the second identifier;

sending the second message to the first end device;

receiving, from the first end device and in response to sending the second message, a signaling message to join the second call, where the first end device and the third end device communicate using the first protocol, the second call being identified using the second identifier that is included in the signaling message;

transferring signaling messages between the third end device and the first end device using the first protocol to connect the first end device to the second call with the third end device; and based on connecting the first end device to the third end device via the second call, terminating the first call between the first end device and the second end device.

12. The method of claim 11, wherein the first protocol is H.323 and the second protocol is SIP, wherein the first message is a SIP REFER message and the second message is a H.450.2 message.

13. The method of claim 11, wherein the first protocol is SIP and the second protocol is H.323, wherein the first message is a H.450.2 message and the second message is a SIP REFER message.

* * * * *